United States Patent Office 3,420,682
Patented Jan. 7, 1969

3,420,682
PRODUCTION OF LOW DENSITY
RIGID SHAPES
Jay Don Gensler, San Antonio, Tex., assignor to The Dow
Chemical Company, Midland, Mich., a corporation of
Delaware
No Drawing. Filed Dec. 13, 1963, Ser. No. 330,245
U.S. Cl. 106—40   5 Claims
Int. Cl. C04b 21/02; C04b 35/04

This invention relates to rigid, refractory materials and, more particularly, is concerned with novel, rigid, porous refractory structures of alkaline earth metal oxide-alkaline earth metal sulfate compositions and to a process for preparation thereof. The term "alkaline earth metal," as used herein, refers to magnesium and calcium. The terms "aqueous mass" or "wet mass," as used herein, refer to a mass in a form ranging from a thin paste to a substantially damp solid.

The rigid structured products of the instant invention may be shaped as bars, rods, sheets, cylinders and the like and find utility as thermal insulators, panels, firewalls, electrical insulators and insulation for sandwich type construction material.

The product of this invention will withstand numerous temperature cyclings ranging from room temperature to 1000° C. without rupturing, degrading or losing its insulation values. In addition, this product can be effectively employed as an insulator for use at low temperatures if care is taken to exclude condensation and other sources of water therefrom.

Insulating products known and used heretofore have one or more drawbacks including for example, failure at high temperatures, lack of structural strength, high cost, complicated fabrication methods and limited utility. To illustrate further, such common insulation materials as magnesium oxysulfate and magnesium oxychloride lose water of hydration at high temperatures and thus become powdery, crumbly and suffer a reduction in physical strength in use. The magnesium-based insulating and refractory products employing asbestos degrade when used at high temperatures and usually have little or no physical strength which contributes to the structural strength of a wall, enclosure or other application where they may be employed. The fibrous inorganic insulating materials, e.g., $SiO_2$, $Al_2O_3$—$SiO_2$ and similar materials have no structural strength and cannot be effectively employed as an insulation material in "sandwich" type panels wherein a portion of the structural strength is dependent on the insulation material.

Accordingly, it is an object of the present invention to provide a novel refractory composition and a method of making the same.

It is also an object of the present invention to provide a novel composition of matter which can be fabricated into any rigid desired shape and which finds ready use as an insulating material both at low temperatures and at high temperatures while maintaining its stability, strength and flame erosion resistance and which has dimensional stability over a wide temperature range.

Another object of the present invention is to provide a novel composition of matter and a process for utilizing the same, said composition of matter offering good structural strength upon fabrication into rigid, porous shape and thus being capable of use in sandwich-type insulating construction.

It is a further object of the present invention to provide a low density, porous, high temperature insulating material fabricated from magnesium oxide-magnesium sulfate or calcium oxide-calcium sulfate compositions and a novel method for fabricating such material.

These and other objects will become apparent after reading the detailed description presented hereinafter.

In general, the present invention comprises heating an aqueous mass of hydrated $MgSO_3$ or hydrated $CaSO_3$, thereby providing a low density, porous, rigid article which has excellent insulation properties.

In order to form said composition of the instant invention, a wet mass of the hydrated sulfite salt is placed in a forming apparatus and heated to a temperature and for a time so as to substantially remove all of the water of hydration and some of the $SO_2$ present therein. Usually, said heating is done at a temperature within the range of from about 400° to about 1000° C. for a time within the range of from about 2 to about 4 hours.

The concentrated paste-like mass of said alkaline earth metal sulfite in water should contain enough water to thoroughly wet the salt but not provide any substantial flow of fluidity.

The mold containing the slurry should be calcined before the moisture can evaporate at low temperature. The calcining is performed at least until no more smoke or visible vapor is being given off. Longer calcining is not harmful to the product but is not necessary.

In a preferred form of this invention, the first step is to prepare a wet mas of hydrated $MgSO_3$ ($MgSO_3 \cdot 6H_2O$). this may be done by adding water to previously formed $MgSO_3 \cdot 6H_2O$. Hydrated $MgSO_3$ may also be prepared by reacting MgO and $SO_2$ in an aqueous media, e.g. $SO_2$ can be bubbled into water at room temperature to give a saturated solution, MgO then is added to the aqueous solution while the $SO_2$ bubbling is continued and the entire aqueous mixture is being agitated. As the MgO is added, it dissolves and hydrated $MgSO_3$ immediately forms.

In general, the preparation of $MgSO_3$ is preferably done at room temperature. Higher temperatures can result in formation of detrimental amounts of $MgSO_4$.

The hydrated $MgSO_3$ so formed is then removed from the mother liquor, and while still in a wet condition, i.e., a paste-like mass and not in a powdery condition is packed into a mold. Usually said paste-like mass is comprised of from about 75 to 90 percent $MgSO_3 \cdot 6H_2O$. The so-filled mold is placed in a furnace and heated to temperatures in a range from about 400° to 1000° C. and for a time in a range from about 2 to 4 hours in order to drive off all the water of hydration along with the excess $SO_2$ (i.e., so that no more visible vapors are seen). The so-filled mold is allowed to cool (e.g., air cooled). The now-formed $MgO–MgSO_4$ product is removed from the mold and is seen to be a rigid, porous structure which is not powdery or crumbly. The voids in the structure are substantially uniform in size and distribution.

The refractory products made from the above process contain from about 10 to about 40 weight percent MgO, from about 60 to about 90 weight percent $MgSO_4$ and from about 20 to about 0 weight percent $MgSO_3$.

The following examples are merely illustrative of the invention disclosed herein and are not intended to limit it thereto.

EXAMPLE 1

In order to show the general characteristics of the composition of matter disclosed herein, the following procedure was carried out:

A wet mass of hydrated $MgSO_3$ was prepared by bubbling $SO_2$ into 24 liters of water at room temperature until excess $SO_2$ was seen escaping from the $SO_2$ saturated water. Then, as the $SO_2$ bubbling was continued and the aqueous mixture was agitated, MgO was added until a total of about 800 grams was introduced. As the MgO was added, it dissolved with almost instantaneous formation of hydrated $MgSO_3$ crystals.

The hydrated $MgSO_3$ crystals were removed from the mother liquor, with retention of sufficient excess water such that the hydrated $MgSO_3$ was "wet" but not "dripping wet."

710.5 grams of the wet hydrated $MgSO_3$ was packed into an aluminum foil-lined mold with dimensions of $5^{31}/_{32}$ inches by $2^{31}/_{32}$ inches by $1^{31}/_{32}$ inches. The so-filled mold was placed in a furnace and was heated for 30 minutes at 275° C., 30 minutes at 400° C. and 2 hours at 575° C. until no more white vapors ($SO_2$) were observed.

The specimen was removed from the mold, allowed to cool and the aluminum foil was removed. A bar weighing about 241.4 grams and measuring almost $5\frac{7}{8}$ inches by $2^{15}/_{16}$ inches by $1^{15}/_{16}$ inches was produced. The density of the fabricated product was 27.5 pounds per cubic foot. The volume shrinkage was less than 2 percent. This bar had a rigid, porous structure and was not powdery or crumbly. The voids in the structure were substantially uniform in size and distribution.

In a second run, a wet mass of hydrated $MgSO_3$ was heated only at 575° C. for 2 hours. The density of the product from this run was found to be 26 pounds per cubic foot and the volume shrinkage was less than two percent.

The compression strength of this material was measured by the following test:

A 3 inch by 1 inch by ½ inch specimen was sawed from the bar and force was applied parallel to the 3 inch axis by using a Tinius-Olsen universal testing machine. The machine applied force at a linear loading rate of 0.1 inch per minutes to the point of failure. The compressive strength was thus found to be 274 pounds per square inch.

In a third run, a specimen prepared according to this same process was calcinated for 2 hours at 575° C. Chemical analysis of the final product gave the following data: $MgO=20.5$ percent, $MgSO_4=79.5$ percent, $MgSO_3=2.0$ percent. (The total of 102 percent product indicates that the analytical procedure was not precise.)

In still another run, a similarly prepared specimen was calcinated an additional 4 hours at 800° to 1000° C. and the data obtained on chemical analysis of the final product were the following: $MgO=30.3$ percent, $MgSO_4=69.3$ percent, $MgSO_3=0.4$ percent.

EXAMPLE 2

In order to show the insulation properties of the composition of matter of this invention, the following procedure was carried out:

A flame erosion heat conductance test was used on various specimens of commercialy available refractories (controls) and products of the present invention. This test consisted of placing the nozzle of a propane torch two inches away from the specimen to be tested. When the torch was lit, the tip of the flame met the center of the surface of the specimen. Each specimen was ¾ inch thick and at least 1½ inches wide. A thermocouple was placed in the center of and against the back surface of the specimen to measure the amount of heat passing through. The propane torch caused each specimen tested to become white hot at a temperature of about 1100° C. Each test specimen was heated to a temperature of approximately 1100° C. The specimens tested and the results obtained are as follows.

Controls (1) Fibrous alumina-silica (commercially known as Fiberfrax): This test specimen was not degraded or eroded by the flame, but the thermocouple indicated that the back surface of the specimen reached 190° C.

(2) $MgCO_3$-asbestos insulating material (commercially known as 85 percent magnesia): This test specimen was completely eroded through in about 6½ minutes by the propane torch flame, the eroded area having a charred appearance.

*Present invention.*—A sample of the same type of material in accordance with the instant invention prepared as shown in Example 1: The test specimen was only slightly eroded in 40 minutes of exposure to the flame. The erosion was in the form of a crack that measured ¼ inch in depth at its greatest point. No charring was apparent. The thermocouple on the back side registered only 110° C. which indicates that the heat transfer through this test specimen was less than that of the commercially available alumina-silica (Fiberfrax).

Similarly, rigid shapes of $CaO-CaSO_4$ are made from $CaSO_3 \cdot \frac{1}{2}H_2O$. The $CaSO_3 \cdot \frac{1}{2}H_2O$ is prepared by adding CaO to water which has a large amount of (but not saturated with) $SO_2$ dissolved therein. The hydrated $CaSO_3$ so formed is then removed from the mother liquor and while still in a wet condition, i.e., a paste-like mass, is packed into a mold, calcined and cooled in the same manner as for the hydrated $MgSO_3$ slurry thereby forming a rigid, porous $CaO-CaSO_4$ refractory.

The $CaO-CaSO_4$ product so formed is comprised of from about 10 to about 40 weight percent CaO, from about 60 to about 90 weight percent $CaSO_4$ and from about 20 to about 0 weight percent $CaSO_3$.

Various modifications can be made in the method of the present invention without departing from the spirit or scope thereof for it is to be understood that I limit myself only as defined in the appended claims.

What is claimed is:

1. A novel composition of matter which comprises a rigid, porous, calcined mass consisting essentially of from about 10 to about 40 weight percent alkaline earth metal oxide, from about 60 to about 90 weight percent alkaline earth metal sulfate and from about 20 to about 0 weight percent alkaline earth metal sulfite, said alkaline earth metal being a member selected from the group consisting of magnesium and calcium.

2. A novel composition of matter which comprises a rigid, porous, calcined mass consisting essentially of from about 10 to about 40 weight percent MgO, from about 60 to about 90 weight percent $MgSO_4$ and from about 20 to about 0 weight percent $MgSO_3$.

3. A novel composition of matter which comprises a rigid, porous, calcined mass consisting essentially of from about 10 to about 40 weight percent CaO, from about 60 to about 90 weight percent $CaSO_4$ and from about 20 to about 0 weight percent $CaSO_3$.

4. A method for producing low density $MgO-MgSO_3$ rigid shapes from an aqueous mass of hydrated $MgSO_3$ which comprises:
   (1) placing the aqueous mass consisting essentially of $MgSO_3 \cdot 6H_2O$ into a mold; and
   (2) heating said aqueous mass of $MgSO_3 \cdot 6H_2O$ to a temperature within the range from about 400° to 1000° C. thereby removing excess moisture and water of hydration and converting the $MgSO_3 \cdot 6H_2O$ to a rigid, porous mass of $MgO-MgSO_4$ as defined in claim 2.

5. A method for producing low density $CaO-CaSO_4$ rigid shapes from an aqueous mass of hydrated $CaSO_3$ which comprises:
   (1) placing the aqueous mass consisting essentially of $CaSO_3 \cdot \frac{1}{2}H_2O$ into a mold; and (2) heating said aqueous mass of $CaSO_3 \cdot \frac{1}{2}H_2O$ to a temperature within the range from about 400° to 1000° C. thereby removing excess moisture and water of hydration and converting the $CaSO_3 \cdot \frac{1}{2}H_2O$ to a rigid, porous mass of $CaO$–$CaSO_4$ as defined in claim 3.

References Cited

UNITED STATES PATENTS 3,138,472  6/1964  Sommer _____ 10—61

OTHER REFERENCES

Sillen et al.: Solid-Gas Equilibria of Importance in Burning Concentrated Calcium or Magnesium Sulfite Waste Liquor, Svensk Papperstidning, vol. 55, No. 16.5, Sept. 4, 1952 (pages 622–631), 23–129.

HELEN M. McCARTHY, *Primary Examiner.*

U.S. Cl. X.R.

106—87, 88, 64, 105, 109, 58; 23—122, 128, 129